(12) United States Patent
Nonogaki et al.

(10) Patent No.: US 9,969,140 B2
(45) Date of Patent: May 15, 2018

(54) TIRE-HOLDING DEVICE

(71) Applicant: TOYO TIRE & RUBBER CO., LTD., Osaka-shi, Osaka (JP)

(72) Inventors: Yuta Nonogaki, Osaka (JP); Taizo Yamamoto, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 34 days.

(21) Appl. No.: 15/292,807

(22) Filed: Oct. 13, 2016

(65) Prior Publication Data
US 2017/0106613 A1    Apr. 20, 2017

(30) Foreign Application Priority Data
Oct. 15, 2015   (JP) ................................. 2015-203772

(51) Int. Cl.
*B29D 30/06* (2006.01)

(52) U.S. Cl.
CPC ..... *B29D 30/0662* (2013.01); *B29D 30/0654* (2013.01); *B29D 30/0645* (2013.01); *B29D 2030/0666* (2013.01); *B29D 2030/0667* (2013.01); *B29K 2821/00* (2013.01)

(58) Field of Classification Search
CPC ............ B29D 30/0645; B29D 30/0654; B29D 30/0662; B29D 2030/0666; B29D 2030/0667
See application file for complete search history.

(56) References Cited

U.S. PATENT DOCUMENTS

| | | | | |
|---|---|---|---|---|
| 5,020,982 A | * | 6/1991 | Kubota | B29D 30/0601 264/315 |
| 5,151,242 A | * | 9/1992 | Soeda | B29D 30/0601 264/315 |
| 6,343,917 B1 | * | 2/2002 | Mitamura | B29D 30/0645 425/48 |
| 7,740,462 B2 | * | 6/2010 | Ichimaru | B29D 30/0603 425/31 |
| 2009/0263524 A1 | | 10/2009 | Ichimaru | |
| 2010/0068320 A1 | * | 3/2010 | Kuwabara | B29D 30/0601 425/42 |

FOREIGN PATENT DOCUMENTS

| | | | |
|---|---|---|---|
| JP | 7-227852 | * | 8/1995 |
| JP | 2007-98803 A | | 4/2007 |

* cited by examiner

*Primary Examiner* — James P Mackey
(74) *Attorney, Agent, or Firm* — Westerman, Hattori, Daniels & Adrian, LLP

(57) ABSTRACT

A tire-holding device includes:
  a shaft body having a portion thereof inserted into a bladder which is fixed to the shaft body, the bladder expanding in a tire to hold the tire; and
  a support body which comes into contact with the shaft body to support the shaft body,
  the shaft body includes an inner hole placed inside the bladder, and an outer hole placed outside the bladder and is brought into communication with the inner hole, and
  the support body includes a support hole, and when the support body supports the shaft body, the outer hole and the support hole come into communication with each other irrespective of a position of the shaft body in its circumferential direction.

10 Claims, 16 Drawing Sheets

TIRE-HOLDING DEVICE

CROSS REFERENCE TO RELATED APPLICATIONS

This application claims the benefit of priority of Japanese application no. 2015-203772, filed on Oct. 15, 2015, which is incorporated herein by reference.

BACKGROUND OF THE INVENTION

Field of the Invention

The present invention relates to a tire-holding device including a shaft body and a support body which supports the shaft body. A bladder for expanding in a tire to hold the tire is fixed to the shaft body, and the support body supports the shaft body.

Description of the Related Art

Conventionally, as a mechanism for holding a tire, there is known a tire-holding device including a shaping unit including a shaft body to which a bladder is fixed, and a fluid supply unit for supplying fluid into the bladder (e.g., JP-A-2007-98803). If the fluid supply unit supplies fluid into the bladder, the bladder expands in the tire and holds the tire.

The shaping unit includes a fluid port for supplying fluid into the bladder. To supply fluid into the bladder through the fluid port, it is necessary to precisely position the shaft body in a circumferential direction of the tire-holding device so that the fluid port is located at a predetermined position.

SUMMARY OF THE INVENTION

Hence, in view of the above-described circumstances, it is an object of the present invention to provide a tire-holding device which does not need to precisely position a shaft body in a circumferential direction of the tire-holding device.

There is provided a tire-holding device including:

a shaft body having a portion thereof inserted into a bladder which is fixed to the shaft body, the bladder expanding in a tire to hold the tire; and a support body which comes into contact with the shaft body to support the shaft body, wherein the shaft body includes an inner hole placed inside the bladder, and an outer hole placed outside the bladder and is brought into communication with the inner hole, and the support body includes a support hole, and when the support body supports the shaft body, the outer hole and the support hole come into communication with each other irrespective of a position of the shaft body in its circumferential direction.

Also, the tire-holding device may have a configuration in which:

the support body includes an end surface support portion which supports an end surface of the shaft body, the outer hole is placed in a position on an axis of the shaft body in the end surface of the shaft body, and when the support body supports the shaft body, the support hole is placed at a position on the axis of the shaft body in the end surface support portion so that the support hole comes into communication with the outer hole irrespective of a position of the shaft body in the circumferential direction.

Also, the tire-holding device may have a configuration in which:

the support body includes an end surface support portion which supports an end surface of the shaft body, the outer hole is placed at a position deviated from an axis of the shaft body in the end surface of the shaft body, the support hole is placed at a position deviated from the axis of the shaft body in the end surface support portion, and when the support body supports the shaft body, at least one of the outer hole and the support hole extends around an axis of the shaft body such that the outer hole and the support hole come into communication with each other irrespective of a position of the shaft body in the circumferential direction.

Also, the tire-holding device may have a configuration in which:

the support body includes a peripheral surface support portion which supports a peripheral surface of the shaft body, the outer hole is placed in the peripheral surface of the shaft body, the support hole is placed in the peripheral surface support portion, and when the support body supports the shaft body, at least one of the outer hole and the support hole extends around the axis of the shaft body such that the outer hole and the support hole come into communication with each other irrespective of a position of the shaft body in its circumferential direction.

Also, the tire-holding device may have a configuration in which:

the shaft body is provided therein with a valve which opens and closes between the inner hold and the outer hole, the valve includes a movable valve body, a valve seat placed closer to the outer hole than the valve body, and a projecting portion which projects from the valve body and which can move with respect to the valve seat together with the valve body, and the projecting portion passes through the valve seat and extends toward the outer hole, and when the valve body comes into contact with the valve seat, the projecting portion projects from the end surface.

Also, the tire-holding device may have a configuration in which:

the shaft body is provided therein with a valve which opens and closes between the inner hold and the outer hole, the valve includes a movable valve body, and a valve seat placed closer to the outer hole than the valve body, the support body includes a projecting portion which projects from the end surface support portion, and a length of the projecting portion is set in such a manner that when the support body supports the shaft body, the projecting portion passes through the outer hole and the valve seat to press the valve body.

Also, the tire-holding device may have a configuration in which:

the valve includes an elastic body which biases the valve body toward the valve seat.

As described above, this tire-holding device exerts an excellent effect that it is unnecessary to precisely position the shaft body in the circumferential direction.

DETAILED DESCRIPTION OF THE PREFERRED EMBODIMENTS

Figure 1:
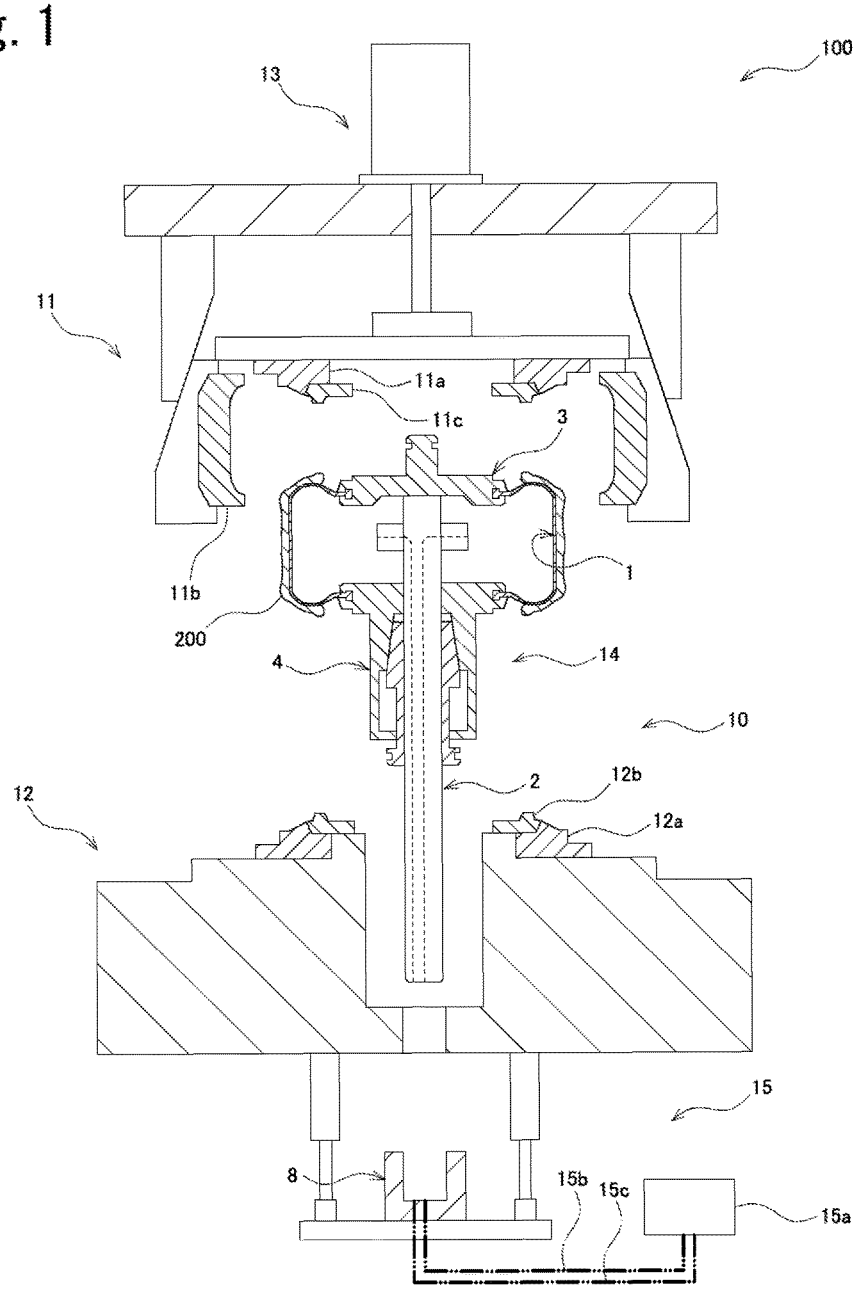
FIG. 1 is a schematic sectional view of an entire tire-vulcanizing device having a tire-holding device according to an embodiment.

An embodiment of a tire-holding device will be described with reference to FIGS. 1 to 17. In the drawings (FIGS. 18 to 24 are also the same), sizes of the drawings do not absolutely match with actual sizes.

As shown in FIG. 1, the tire-vulcanizing device 100 according to an embodiment includes an upper container 11 placed at an upper location, a lower container 12 placed at a lower location, and a drive device 13 for driving an upper container 11. The tire-vulcanizing device 100 includes a tire-holding device 10 for holding the tire 200.

The upper container 11 includes a side mold 11a which forms a sidewall portion of the tire 200, a plurality of tread molds 11b which form a tread portion of the tire 200, and a bead ring 11c into which a bead portion of the tire 200 is fitted. The lower container 12 includes a side mold 12a which forms a sidewall portion of the tire 200, and a bead ring 12b into which a bead portion of the tire 200 is fitted.

When the molds are to be opened, the drive device 13 separates the pair of side molds 11a and 12a from each other, and the drive device 13 moves the plurality of annularly arranged tread molds 11b outward so that the tread molds 11b radially spread. According to this, it is possible to bring the tire 200 in and out.

When the molds are to be closed, the drive device 13 moves the tread molds 11b inward and brings the side molds 11a and 12a close to each other so that the tread molds 11b gather and forma continuously connected annular shape. According to this, inner surfaces of the molds 11a, 11b and 12a can come into intimate contact with an outer surface of the tire 200.

The tire-holding device 10 includes a tire-holding unit 14 for holding the tire 200, and a fluid device 15 for flowing fluid into and out from a tire-holding unit 14. The tire-holding unit 14 is attachable to and detachable from the lower container 12.

The tire-holding unit 14 includes a cylindrical bladder 1 which expands in the tire 200 to hold the tire 200, and a shaft body 2. A portion of the shaft body 2 is inserted into the bladder 1. The tire-holding unit 14 includes a fixing body 3 which fixes the bladder 1 and the shaft body 2 to each other, and a connecting body 4 which connects the bladder 1 and the shaft body 2 to each other.

The fluid device 15 includes a support body 8 which comes into contact with the shaft body 2 to support the same when the tire-holding unit 14 is attached to the lower container 12. The fluid device 15 includes a fluid source 15a through which fluid flows into the bladder 1 and through which fluid flows out from the bladder 1. The fluid device 15 also includes first and second flow paths 15b and 15c which are paths for fluid between the support body 8 and the fluid source 15a. Examples of the fluid are vapor and inert gas such as nitrogen and helium.

Figure 2:
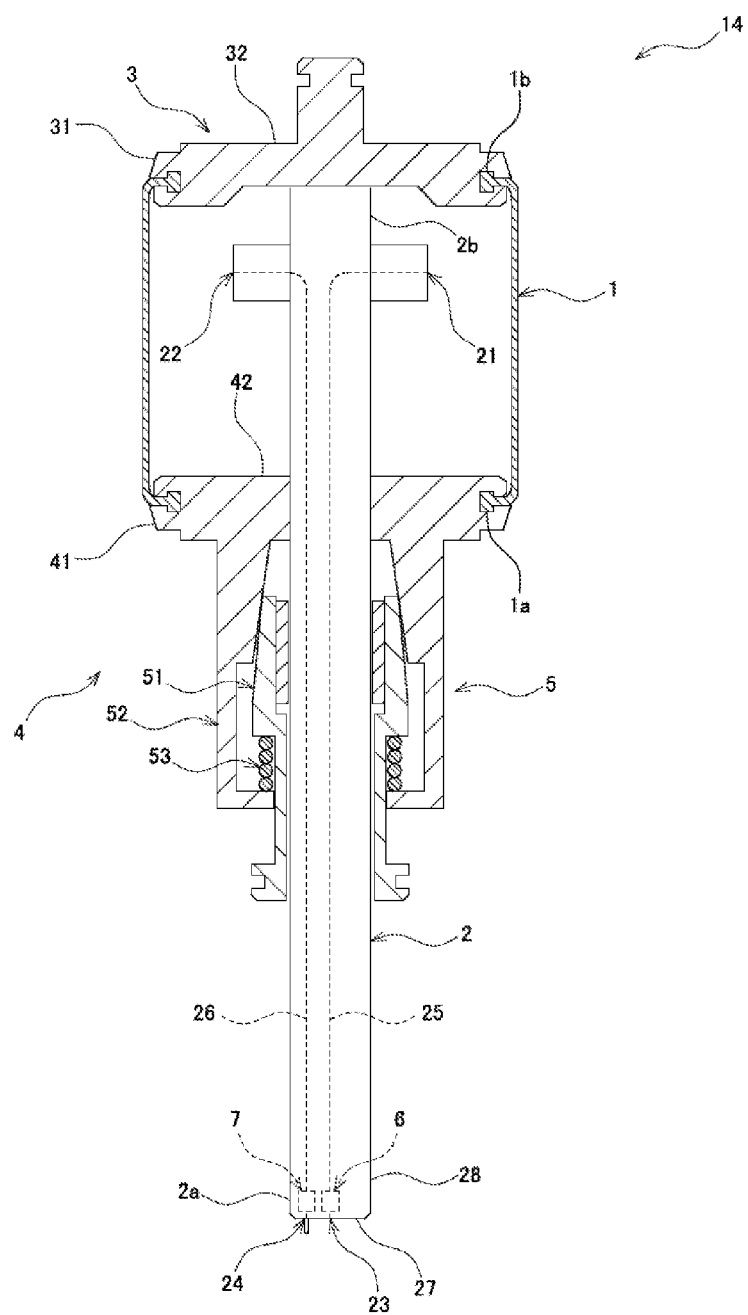
FIG. 2 is a sectional view of an entire tire-holding unit according to the embodiment, and shows a movable state.

As shown in FIG. 2, the bladder 1 is formed into a cylindrical shape, and includes a first opening 1a and a second opening 1b. In the embodiment, the bladder 1 is made of elastic material such as rubber.

The fixing body 3 includes a bladder-fixing portion 31 for fixing the second opening 20b of the bladder 1, and a closing portion 32 for closing the second opening 1b of the bladder 1 to restrain fluid from flowing out from the second opening 1b of the bladder 1. The closing portion 32 is formed into a disk shape, and the bladder-fixing portion 31 is connected to an outer periphery of the closing portion 32.

The closing portion 32 is immovably fixed to a second end 2b on the other side of the shaft body 2. According to this, the fixing body 3 is immovably fixed to the second end 2b on the other side of the shaft body 2, and the fixing body 3 fixes the bladder 1 and the shaft body 2 to each other. The second opening 1b of the bladder 1 can be attached to and detached from the bladder-fixing portion 31.

As shown in FIGS. 2 to 5, the connecting body 4 includes a bladder-fixing portion 41 for fixing the first opening 1a of the bladder 1, and a closing portion 42 for closing the first opening 1a of the bladder 1 to restrain fluid from flowing out from the first opening 1a of the bladder 1. The connecting body 4 includes a switching mechanism 5 which switches between a fixed state where the connecting body 4 is fixed to the shaft body 2 and a movable state where the connecting body 4 can move relative to the shaft body 2 in the axial direction.

The closing portion 42 is formed into an annular disk shape, and the bladder-fixing portion 41 is connected to an outer periphery of the closing portion 42. The shaft body 2 is inserted into a hole of the closing portion 42. The closing portion 42 is switched by the switching mechanism 5 between a fixed state where the closing portion 42 is fixed to the shaft body 2 and a movable state where the closing portion 42 can move relative to the shaft body 2 in the axial direction. The first opening 1a of the bladder 1 can be attached to and detached from the bladder-fixing portion 41.

The switching mechanism 5 includes a cylindrical inner cylindrical body 51 into which the shaft body 2 is inserted, a cylindrical outer cylindrical body 52 into which the inner cylindrical body 51 is inserted, and a biasing body 53 which biases the inner cylindrical body 51 and the outer cylindrical body 52. The outer cylindrical body 52 is fixed to the bladder 1. Specifically, the outer cylindrical body 52 is connected to the bladder-fixing portion 41 and the closing portion 42 on the other side (on the side of second end 2b of shaft body 2) in the axial direction.

As shown in FIGS. 2 to 7, the inner cylindrical body 51 is provided at its other side in the axial direction with an inner cylindrical taper portion 51a. A diameter of an outer periphery of the inner cylindrical taper portion 51a is increased toward one side (toward first end 2a of shaft body 2) in the axial direction. The inner cylindrical body 51 is provided at the one side in the axial direction with an exposed portion 51b which projects from the outer cylindrical body 52.

The outer cylindrical body 52 is provided at its other side in the axial direction with an outer cylindrical taper portion 52a. A diameter of an inner periphery of the outer cylindrical taper portion 52a is increased toward one side in the axial direction. The outer cylindrical body 52 is provided at its one side in the axial direction with a convex portion 52b which projects inward in the radial direction.

The outer cylindrical taper portion 52a is superposed on the inner cylindrical taper portion 51a in the axial direction. Therefore, if the outer cylindrical body 52 moves toward one side in the axial direction relative to the inner cylindrical body 51, the inner periphery of the outer cylindrical taper portion 52a comes into contact with the outer periphery of the inner cylindrical taper portion 51a.

The inner cylindrical taper portion 51a includes an elastic portion 51c. When an outer periphery of the inner cylindrical taper portion 51a comes into contact with an inner periphery of the outer cylindrical taper portion 52a, the elastic portion 51c elastically deforms. More specifically, the inner cylindrical taper portion 51a includes a cylindrical base portion 51d, and a plurality of elastic pieces 51e which project from the base portion 51d toward the other side in the axial direction and which are arranged along the circumferential direction.

The inner cylindrical taper portion 51a is provided at its inner periphery with a pressured contact portion 51f which pressurizes and comes into contact with a peripheral surface 28 of the shaft body 2. If the elastic portion 51c elastically deforms, the pressured contact portion 51f approaches the outer periphery of the shaft body 2 and pressurizes and comes into contact with the peripheral surface 28 of the shaft body 2. In the embodiment, the inner cylindrical body 51 and the outer cylindrical body 52 are made of metal such as stainless steel, for example. Only the pressured contact portion 51f of the inner cylindrical body 51 may be made of material which is different from those of other portions. For example, the contact portion 51f may be made of material having a higher friction coefficient than the shaft body 2.

In the embodiment, the biasing body 53 is a cylindrical coil spring. The inner cylindrical body 51 is inserted into the biasing body 53. The biasing body 53 is placed between the inner cylindrical taper portion 51a of the inner cylindrical body 51 and the convex portion 52b of the outer cylindrical body 52. The biasing body 53 biases the inner cylindrical body 51 and the outer cylindrical body 52, thereby stabilizing them. According to this, the axial direction of the inner cylindrical body 51 and the axial direction of the outer cylindrical body 52 match with each other.

Figure 3:
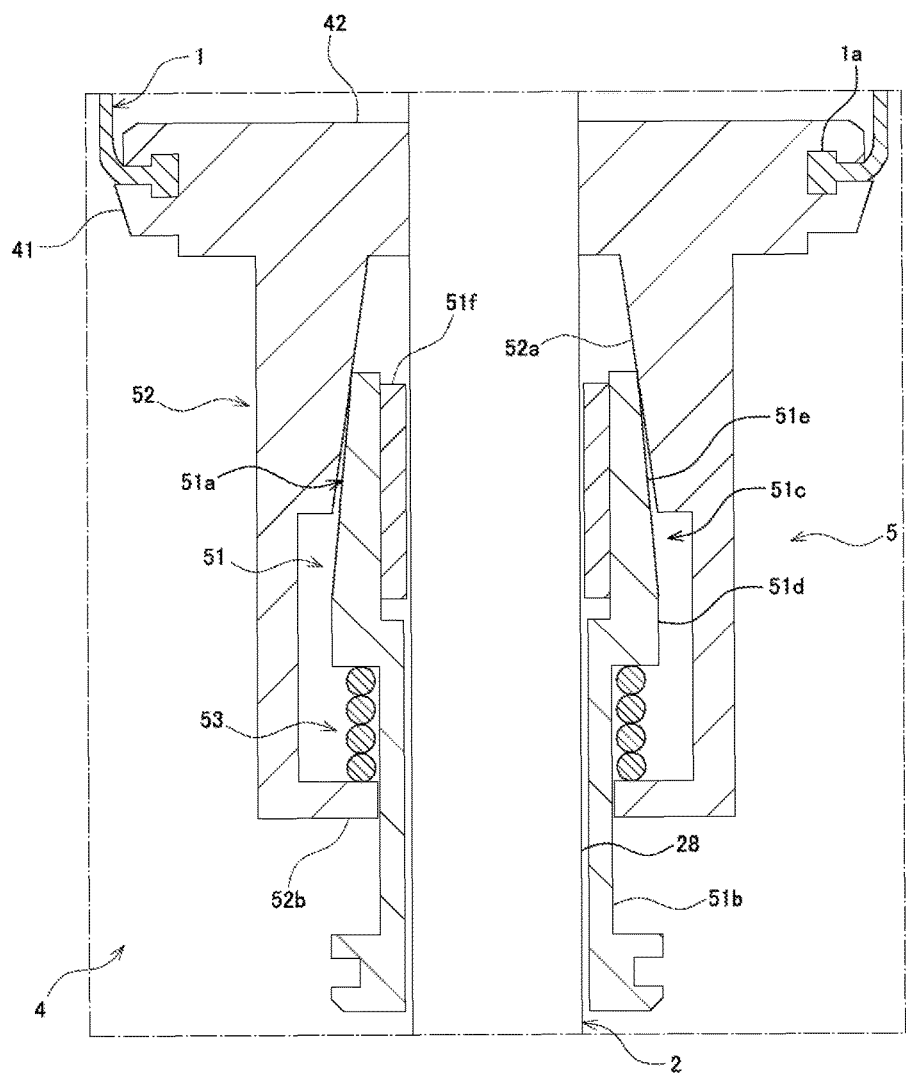
FIG. 3 is an enlarged view of essential portions in FIG. 2.

As shown in FIGS. 2 and 3, when the connecting body 4 is in the movable state, the biasing body 53 elastically deforms such that it shrinks and by this restoring force, the biasing body 53 biases the outer cylindrical body 52 such that the outer cylindrical body 52 moves toward the one side in the axial direction relative to the inner cylindrical body 51. Further, as shown in FIGS. 4 and 5, also when the connecting body 4 is in the fixed state, the biasing body 53 elastically deforms such that it shrinks and by this restoring force, the biasing body 53 biases the outer cylindrical body 52 in such a direction that the outer cylindrical body 52 moves toward the one side in the axial direction relative to the inner cylindrical body 51.

Figure 4:
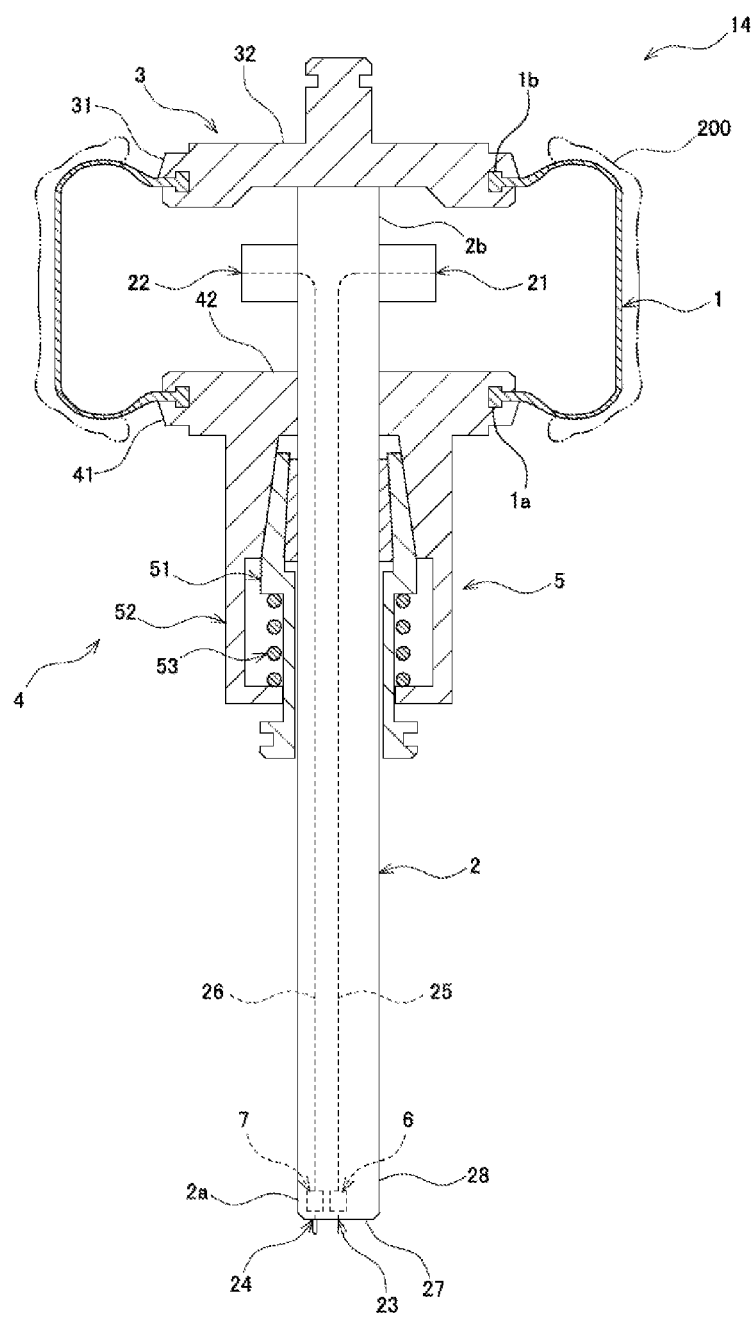
FIG. 4 is a sectional view of the entire tire-holding unit according to the embodiment, and shows a fixed state.
Figure 5:
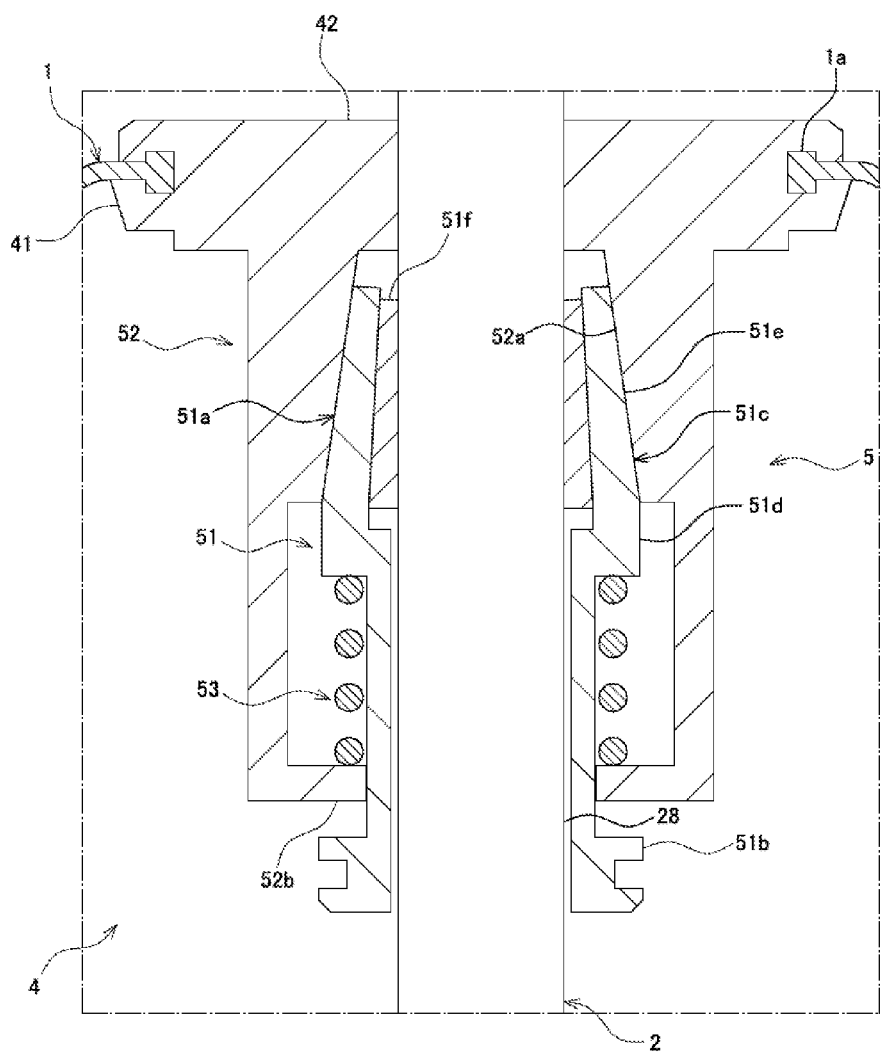
FIG. 5 is an enlarged view of essential portions in FIG. 4.
Figure 6:
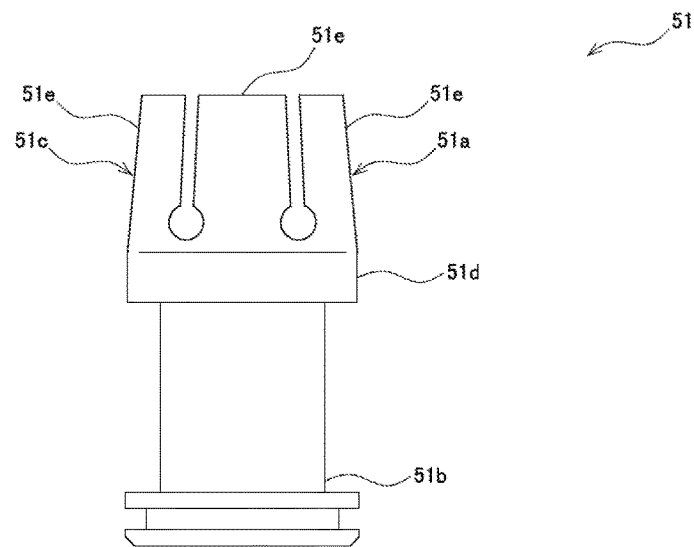
FIG. 6 is a front view of an entire inner cylindrical body according to the embodiment.
Figure 7:
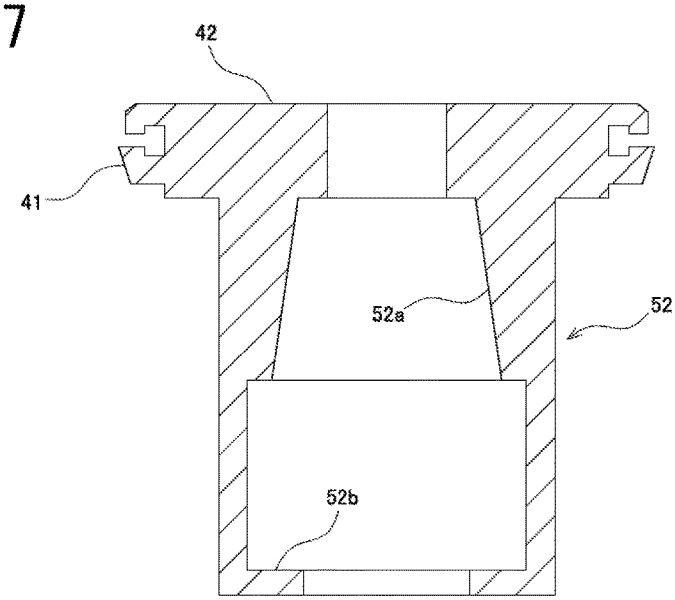
FIG. 7 is a sectional view of an entire assembly having an outer cylindrical body according to the embodiment.

As shown in FIGS. 2 and 4, the shaft body 2 includes first and second inner holes 21 and 22 placed in the bladder 1, and first and second outer holes 23 and 24 placed outside the bladder 1. The shaft body 2 includes a first communicating unit 25 which brings the first inner hole 21 and the first outer hole 23 into communication with each other, and a second communicating unit 26 which brings the second inner hole 22 and the second outer hole 24 into communication with each other.

The shaft body 2 is provided therein with a first valve 6 which opens and closes between the first inner hole 21 and the first outer hole 23, and a second valve 7 which opens and closes between the second inner hole 22 and the second outer hole 24. When the tire-holding unit 14 is attached to the lower container 12, an end surface 27 and a peripheral surface 28 of the support body 8 on the side of a first end 2a are supported by the support body 8.

Of the shaft body 2, an outer shape of a cross section of a portion of the shaft body 2 connected to the connecting body 4 and an outer shape of a cross section of a portion of the shaft body 2 supported by the support body 8 which intersect with an axial direction of the shaft body 2 at right angles are the same along the axial direction. In this embodiment, the portions of the shaft body 2 are formed into columnar shapes, and the outer shape of the cross section of these portions is circular having the same diameters along the axial direction.

The first and second inner holes 21 and 22 are placed between the fixing body 3 and the connecting body 4 so that they are placed in the bladder 1. In the embodiment, in the shaft body 2, fluid flows into the bladder 1 from the first inner hole 21, and fluid in the bladder 1 flows out from the second inner hole 22.

Figure 8:
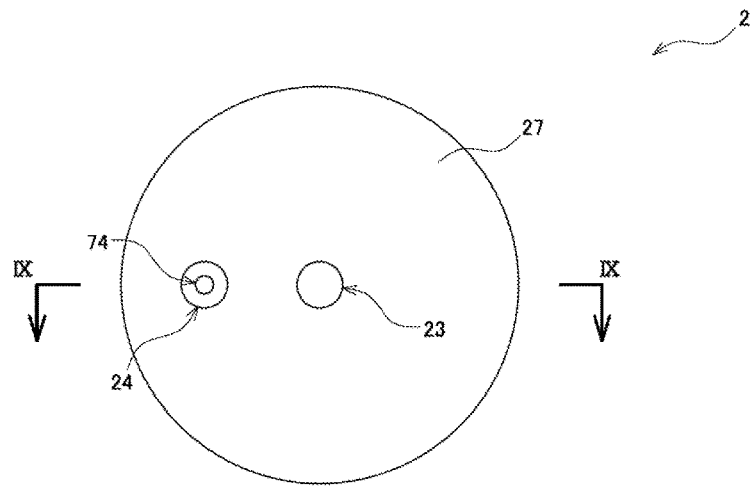
FIG. 8 is a bottom view of an entire shaft body according to the embodiment.
Figure 9:
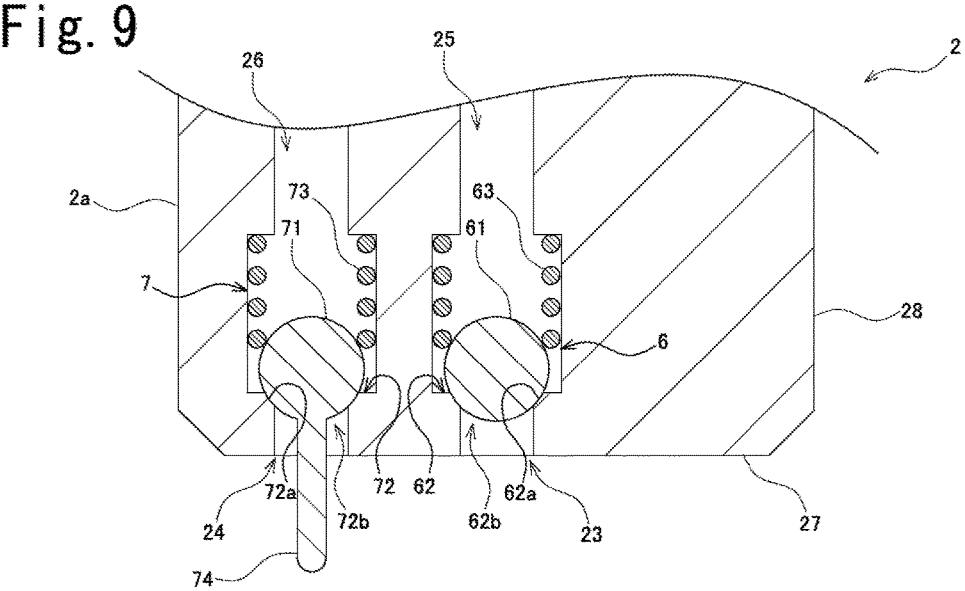
FIG. 9 shows essential portions of the shaft body according to the embodiment, and is an enlarged sectional view taken along line IX-IX in FIG. 8.

As shown in FIGS. 8 and 9, the first outer hole 23 is formed into circular. The first outer hole 23 is placed at a portion in the shaft body 2 supported by the support body 8. Specifically, the first outer hole 23 is placed on an axis of the end surface 27 of the shaft body 2.

The second outer hole 24 is formed into circular. The second outer hole 24 is placed on a portion of the shaft body 2 supported by the support body 8. Specifically, the second outer hole 24 is placed at a position deviated from an axis of the end surface 27 of the shaft body 2.

The first valve 6 includes a movable first valve body 61, a first valve seat 62 placed closer to the first outer hole 23 than the first valve body 61, and a first elastic body 63 which biases the first valve body 61 toward the first valve seat 62 so that the first valve body 61 comes into contact with the first valve seat 62. In a state where the first valve 6 is in its closed state, it closes between the first inner hole 21 and the first outer hole 23, and in its opened state, the first valve 6 opens between the first inner hole 21 and the first outer hole 23.

The first valve seat 62 includes the contact portion 62*a* which comes into contact with the first valve body 61, and a first valve hole 62*b* which is in communication with the first outer hole 23 and is closed when the first valve body 61 comes into contact with the first contact portion 62*a*. The first contact portion 62*a* is formed annularly, and the first valve hole 62*b* is placed at a central portion of the first contact portion 62*a*.

In this embodiment, the first valve body 61 is formed into a spherical shape. The first elastic body 63 always elastically deforms, and biases the first valve body 61 toward the first valve seat 62. In this embodiment, the first elastic body 63 is a coil spring.

Therefore, when the first valve body 61 comes into contact with the first valve seat 62, the first valve 6 is closed, and if the first valve body 61 separates from the first valve seat 62, the first valve 6 opens. When fluid which flows in from the first outer hole 23 biases the first valve body 61 against a biasing force of the first elastic body 63 or internal pressure of the bladder 1, it is possible to switch the first valve 6 from the closed state to the opened state.

The second valve 7 includes a movable second valve body 71, a second valve seat 72 placed closer to the second outer hole 24 than the second valve body 71, and a second elastic body 73 which biases the second valve body 71 toward the second valve seat 72 so that the second valve body 71 comes into contact with the second valve seat 72. The second valve 7 includes a projecting portion 74 which projects from the second valve body 71. When the second valve 7 is closed, it closes between the second inner hole 22 and the second outer hole 24, and when the second valve 7 opens, it opens between the second inner hole 22 and the second outer hole 24.

The second valve seat 72 includes a second contact portion 72*a* which is in contact with the second valve body 71, and a second valve hole 72*b* which is in communication with the second outer hole 24 and is closed when the second valve body 71 comes into contact with the second contact portion 72*a*. The second contact portion 72*a* is formed annularly, and the second valve hole 72*b* is placed at a central portion on the second contact portion 72*a*.

In this embodiment, the second valve body 71 is formed into a spherical shape. The second elastic body 73 always elastically deforms, and the second elastic body 73 biases the second valve body 71 toward the second valve seat 72. In this embodiment, the second elastic body 73 is a coil spring.

The projecting portion 74 passes through the second valve seat 72 (specifically, second valve hole 72*b*), and extends toward the second outer hole 24. In this embodiment, the projecting portion 74 is formed long. When the second valve body 71 comes into contact with the second valve seat 72, the projecting portion 74 projects from the end surface 27 of the shaft body 2. The projecting portion 74 is integrally formed together with the second valve body 71. The projecting portion 74 is movable with respect to the second valve seat 72 together with the second valve body 71.

Therefore, if the second valve body 71 comes into contact with the second valve seat 72, the second valve 7 is closed, and if the second valve body 71 separates from the second valve seat 72, the second valve 7 opens. If the projecting portion 74 is pressed toward the interior of the shaft body 2 against the biasing force of the second elastic body 73 and the internal pressure of the bladder 1, the second valve 7 can be switched from its closed state to its opened state.

Figure 10:
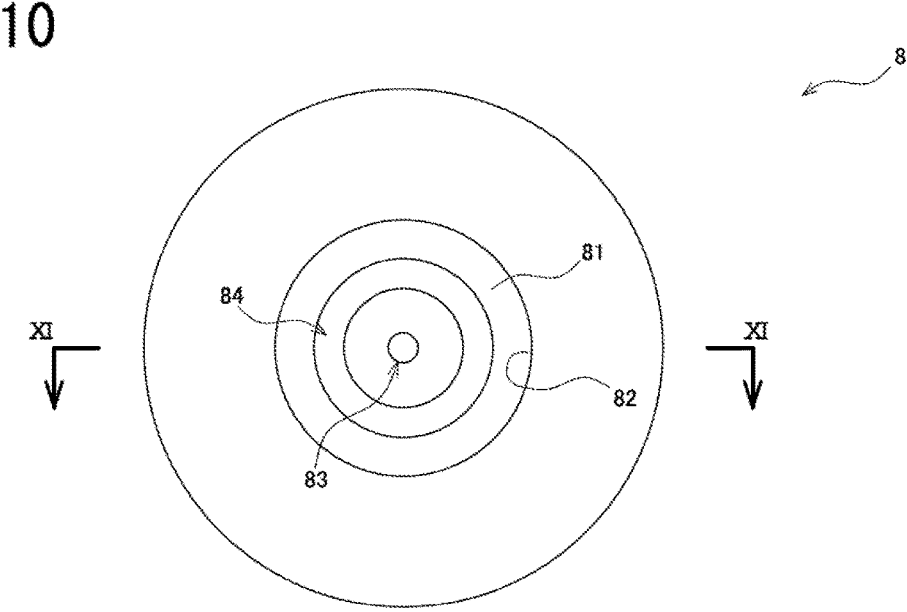
FIG. 10 is a plan view of an entire support body according to the embodiment.
Figure 11:
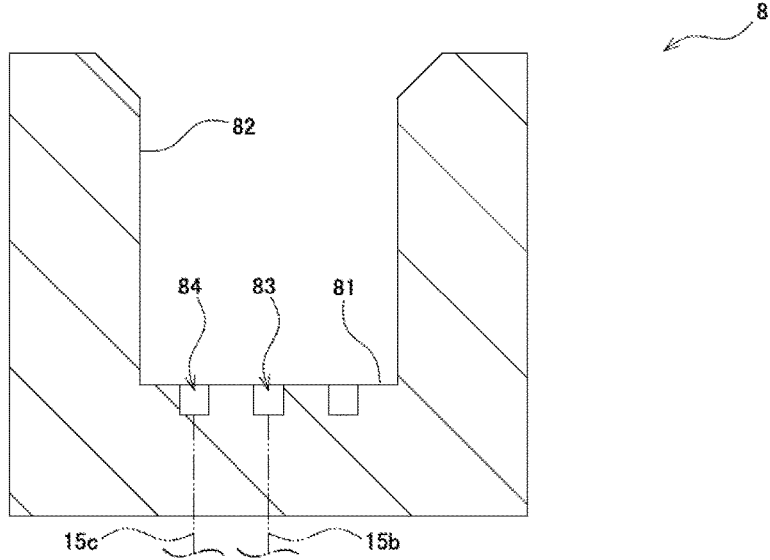
FIG. 11 is a sectional view of the entire support body according to the embodiment, and is a sectional view taken along line XI-XI in FIG. 10.

As shown in FIGS. 10 and 11, the support body 8 includes an end surface support portion 81 which supports the end surface 27 of the shaft body 2, and a peripheral surface support portion 82 which supports the peripheral surface 28 of the shaft body 2. The support body 8 supports the shaft body 2 such that a position of the axis of the shaft body 2 becomes constant irrespective of a position of the shaft body 2 in its circumferential direction (i.e., irrespective of position of second outer hole 24 in the shaft body 2).

The support body 8 includes a first support hole 83 which comes into communication with the first outer hole 23 when the support body 8 supports the shaft body 2. The support body 8 includes a second support hole 84 which comes into communication with the second outer hole 24 when the support body 8 supports the shaft body 2.

The first support hole 83 is formed circular. The first support hole 83 is placed in the end surface support portion 81. The first support hole 83 is placed on the axis of the shaft body 2 with respect to the shaft body 2 which is supported by the support body 8. According to this, the first support hole 83 is brought into communication with the first outer hole 23 when the support body 8 supports the shaft body 2 irrespective of a circumferential position of the shaft body 2.

The second support hole 84 is formed in the end surface support portion 81. The second support hole 84 is placed at a position deviated from the axis of the shaft body 2 with respect to the shaft body 2 supported by the support body 8. Specifically, the second support hole 84 extends around the axis of the shaft body 2 with respect to the shaft body 2 supported by the support body 8. In this embodiment, the second support hole 84 is formed into a continuous annular shape. According to this, the second support hole 84 is in communication with the second outer hole 24 when the support body 8 supports the shaft body 2 irrespective of a circumferential position of the shaft body 2.

A configuration of the tire-holding device 10 according to the embodiment will be described below. Next, the operation of the tire-holding device 10 of the embodiment will be described with reference to FIGS. 12 to 17.

Figure 12:
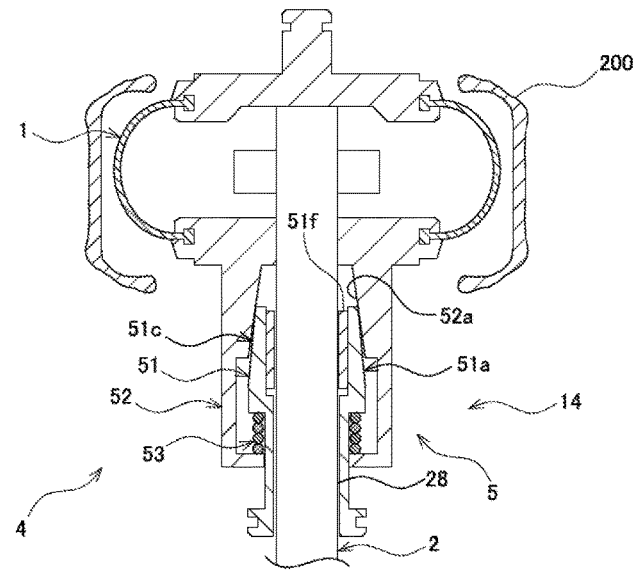
FIG. 12 is a diagram for describing an operation of the tire-holding device according to the embodiment, and is a vertical sectional view of essential portions of the tire-holding unit.

First, the tire-holding unit 14 is detached from the lower container 12, and is placed outside the tire-vulcanizing device 100. As shown in FIG. 12, in a movable state where an elastic portion 51*c* of the inner cylindrical body 51 restores (not elastically deformed), the connecting body 4 can move in the axial direction with respect to the shaft body 2. Therefore, the connecting body 4 is placed at a predetermined position in accordance with the tire 200 to be held.

Figure 13:
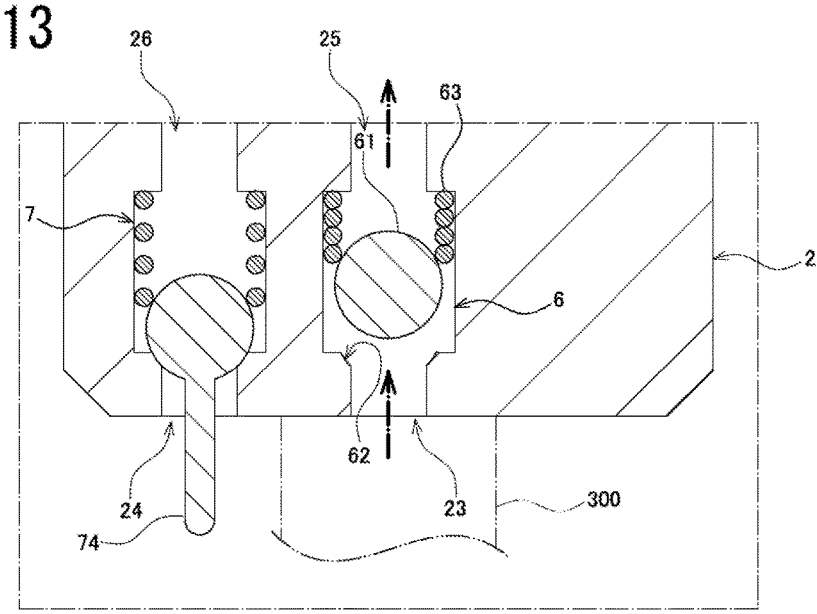
FIG. 13 is a diagram for describing the operation of the tire-holding device according to the embodiment, and is a vertical sectional view of essential portions of the shaft body and the support body.

In a state where the inner cylindrical body 51 and the shaft body 2 are held, a fluid supply device 300 supplies fluid from the first outer hole 23 as shown in FIG. 13. At this time, by biasing the first valve body 61 by fluid against a biasing force of the first elastic body 63 and the internal pressure of the bladder 1, the first valve 6 is switched from the closed state to the opened state. According to this, fluid flows into the bladder 1 through the first outer hole 23, the first valve 6, the first communicating unit 25 and the first inner hole 21.

Figure 14:
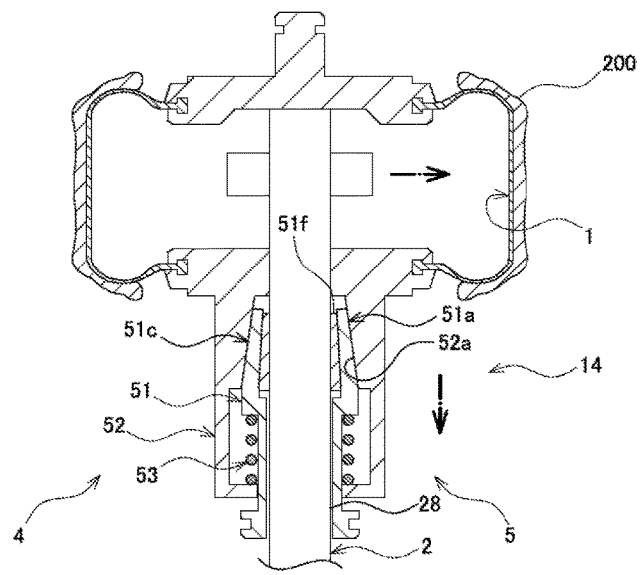
FIG. 14 is a diagram for describing the operation of the tire-holding device according to the embodiment, and is a vertical sectional view of essential portions of the tire-holding unit.

According to this, as shown in FIG. 14, as the bladder 1 swells, the outer cylindrical body 52 moves toward one side (lower side in FIG. 14) in the axial direction with respect to the inner cylindrical body 51. Since an inner peripheral portion of an outer tapered portion 52a comes into contact with an outer peripheral portion of an inner tapered portion 51a, the elastic portion 51c elastically deforms. As a result, since the pressurizing contact portion 51f approaches and comes into contact with a peripheral surface 28 of the shaft body 2 under pressure, the connecting body 4 is fixed to the shaft body 2, and the shaft body 2 is switched to the fixed state.

If the bladder 1 swells until it holds the tire 200, the fluid supply device 300 stops the supply of fluid. When the connecting body 4 is in its fixed state, a biasing body 53 biases the outer cylindrical body 52 in a direction in which the outer cylindrical body 52 moves toward one side in the axial direction with respect to the inner cylindrical body 51. Therefore, the fixed state of the connecting body 4 is maintained unless an external force is applied to the connecting body 4.

Figure 15:
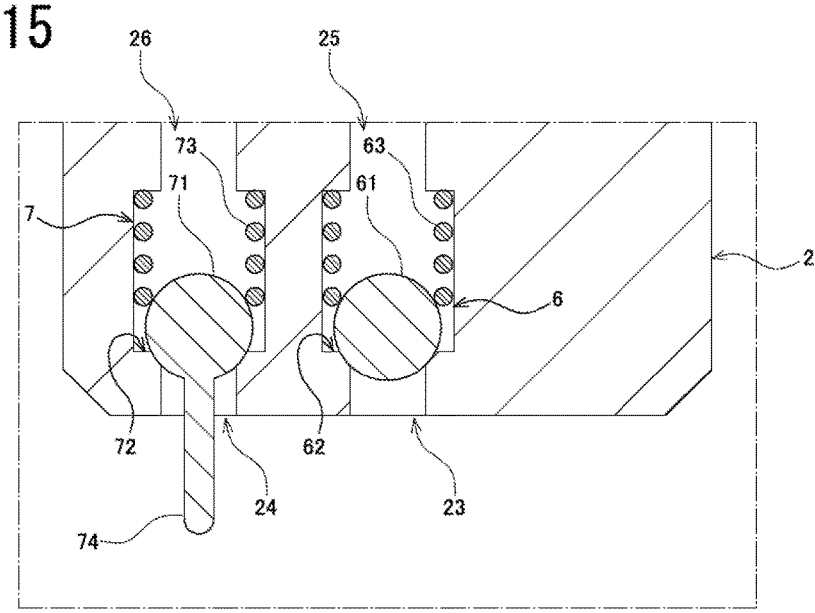
FIG. 15 is a diagram for describing the operation of the tire-holding device according to the embodiment, and is a vertical sectional view of essential portions of the shaft body and the support body.

Since the fluid supply device 300 stops the supply of fluid, as shown in FIG. 15, the valve bodies 61 and 71 are in contact with the valve seats 62 and 72 by the biasing forces of the elastic bodies 63 and 73 and the internal pressure of the bladder 1. According to this, the first and second valves 6 and 7 are brought into the closed states. Therefore, since the internal pressure of the bladder 1 is maintained, it is possible to maintain the state where the tire-holding unit 14 holds the tire 200. According to this, it is possible to transfer the tire-holding unit 14 in a state where the tire 200 is held.

Figure 16:
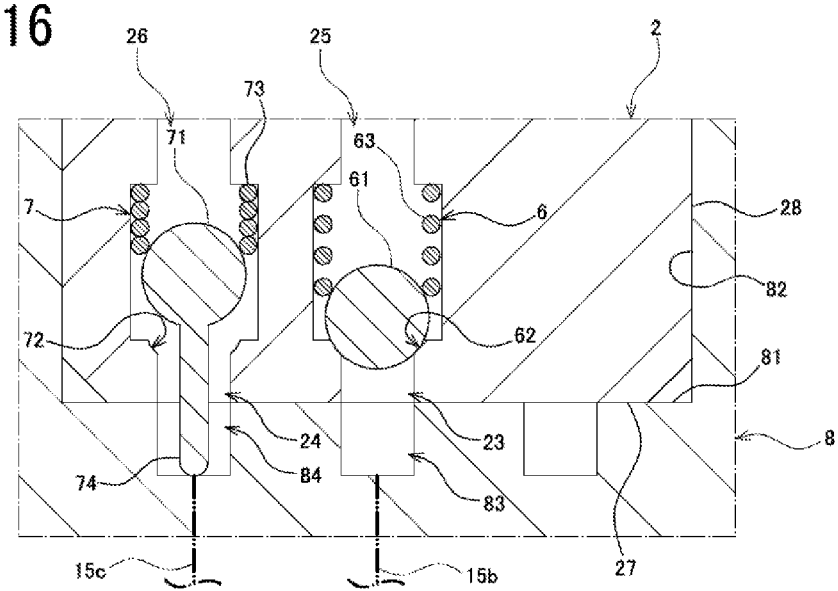
FIG. 16 is a diagram for describing an operation of the tire-holding device according to the embodiment, and is a vertical sectional view of essential portions of the shaft body and the support body.

Thereafter, if the tire-holding unit 14 is attached to the lower container 12, the shaft body 2 is supported by the support body 8 as shown in FIG. 16. Specifically, the end surface 27 of the shaft body 2 is supported by the end surface support portion 81 of the support body 8, and the peripheral surface 28 of the shaft body 2 is supported by the peripheral surface support portion 82 of the support body 8. According to this, an axial position of the shaft body 2 with respect to the support body 8 becomes constant irrespective of a circumferential position of the shaft body 2 with respect to the support body 8.

At this time, since the support body 8 presses the projecting portion 74 toward an interior of the shaft body 2 against the biasing force of the second elastic body 73 and the internal pressure of the bladder 1, the second valve body 71 separates from the second valve seat 72. The first valve body 61 is in contact with the first valve seat 62 by the biasing force of the first elastic body 63 and the internal pressure of the bladder 1.

The first outer hole 23 is placed at a position on the axis of the shaft body 2, and the first support hole 83 is also placed at a position on the axis of the shaft body 2. According to this, the first outer hole 23 and the first support hole 83 are in communication with each other irrespective of a circumferential position of the shaft body 2 with respect to the support body 8.

The second outer hole 24 is placed in a position deviated from the axis of the shaft body 2, and the second support hole 84 annularly extends such that it one laps around the axis of the shaft body 2. According to this, the second outer hole 24 and the second support hole 84 are in communication with each other irrespective of a circumferential position of the shaft body 2 with respect to the support body 8 (i.e., irrespective of position of second outer hole 24 with respect to support body 8).

Figure 17:
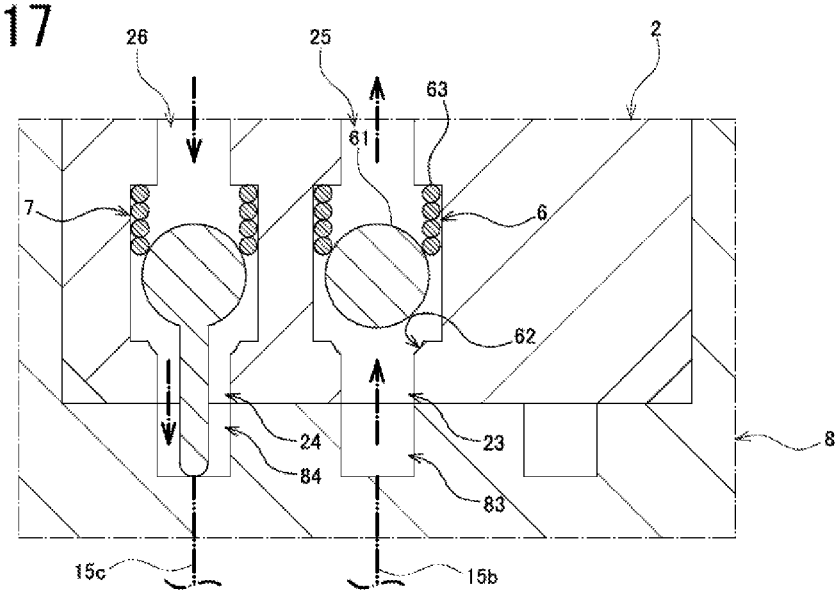
FIG. 17 is a diagram for describing the operation of the tire-holding device according to the embodiment, and is a vertical sectional view of essential portions of the shaft body and the support body.

Thereafter, if fluid is supplied from the fluid source 15a, the fluid flows into the shaft body 2 through the first flow path 15b, the first support hole 83 and the first outer hole 23. At this time, as shown in FIG. 17, the fluid biases the first valve body 61 against the biasing force of the first elastic body 63 and the internal pressure of the bladder 1. According to this, the first valve 6 is switched from the closed state to the opened state. The fluid flows into the bladder 1 through the first outer hole 23, the first valve 6, the first communicating unit 25 and the first inner hole 21.

The fluid in the bladder 1 flows out from the shaft body 2 through the second inner hole 22, the second communicating unit 26, the second valve 7 and the second outer hole 24. The fluid which flows out from the shaft body 2 returns to the fluid source 15a (or is discharged from fluid source 15a) through the second support hole 84 and a second flow path 15c.

When the tire-vulcanizing device 100 vulcanizes the tire 200 in this manner, the fluid flows into the bladder 1 or flows out from the bladder 1. The fluid device 15 controls an inflow amount and an outflow amount of fluid based on the internal pressure of the bladder 1 and an amount of heat to be supplied to the tire 200.

As described above, the tire-holding device 10 according to the embodiment includes:

a shaft body 2 having a portion thereof inserted into a bladder 1 which is fixed to the shaft body 2, the bladder 1 expanding in a tire 200 to hold the tire 200; and a support body 8 which comes into contact with the shaft body 2 to support the shaft body 2, the shaft body 2 includes an inner hole 21, 22 placed inside the bladder 1, and an outer hole 23, 24 placed outside the bladder 1 and is brought into communication with the inner hole 21,22, and the support body 8 includes a support hole 83,84, and when the support body 8 supports the shaft body 2, the outer hole 23,24 and the support hole 83,84 come into communication with each other irrespective of a position of the shaft body 2 in its circumferential direction.

According to this configuration, a portion of the shaft body 2 is inserted into the bladder 1, and the bladder 1 is fixed to the shaft body 2. The shaft body 2 includes the inner holes 21 and 22 which are placed inside the bladder 1, and the outer holes 23 and 24 which are placed outside the bladder 1 and in communication with the inner holes 21 and 22, and the support body 8 includes support holes 83 and 84.

When the support body 8 comes into contact with the shaft body 2 and supports the shaft body 2, the support holes 83 and 84 come into communication with the outer holes 23 and 24 irrespective of the circumferential position of the shaft body 2. According to this, fluid can flow into and flow out from the bladder 1 through the support holes 83 and 84, the outer holes 23 and 24 and the inner holes 21 and 22.

Therefore, it is unnecessary to precisely position the shaft body 2 with respect to the support body 8 in the circumferential direction.

In the tire-holding device 10 according to the embodiment, the support body 8 includes an end surface support portion 8 which supports an end surface 27 of the shaft body 2, the outer hole 23 is placed in a position on an axis of the shaft body 2 in the end surface 27 of the shaft body 2, and when the support body 8 supports the shaft body 2, the support hole 83 is placed at a position on the axis of the shaft body 2 in the end surface support portion 81 so that the support hole 83 comes into communication with the outer hole 23 irrespective of a position of the shaft body 2 in the circumferential direction.

According to this configuration, the outer hole 23 is placed at a position on the axis of the shaft body 2 of the end surface 27 of the shaft body 2. The support body 8 includes the end surface support portion 81 which supports the end surface 27 of the shaft body 2, and the support hole 83 is placed at a position on the axis of the shaft body 2 in the end surface support portion 81. According to this, when the support body 8 supports the shaft body 2, the outer hole 23 and the support hole 83 can be brought into communication with each other irrespective of a circumferential position of the shaft body 2.

In the tire-holding device 10 according to the embodiment, the support body 8 includes an end surface support portion 8 which supports an end surface 27 of the shaft body 2, the outer hole 24 is placed at a position deviated from an axis of the shaft body 2 in the end surface 27 of the shaft body 2, the support hole 84 is placed at a position deviated from the axis of the shaft body 2 in the end surface support portion 81, and when the support body 8 supports the shaft body 2, at least one of the outer hole 24 and the support hole 84 extends around an axis of the shaft body 2 such that the outer hole 24 and the support hole 84 come into communication with each other irrespective of a position of the shaft body 2 in the circumferential direction.

According to this configuration, the outer hole 24 is placed at a position deviated from the axis of the shaft body 2 of the end surface 27 of the shaft body 2. The support body 8 includes the end surface support portion 81 which supports the end surface 27 of the shaft body 2. The support hole 84 is placed at a position deviated from the axis of the shaft body 2 of the end surface support portion 81. At least one of the outer hole 24 and the support hole 84 (support hole 84 in this embodiment) extends around the axis of the shaft body 2. Therefore, when the support body 8 supports the shaft body 2, the outer hole 24 and the support hole 84 can be brought into communication with each other irrespective of the circumferential position of the shaft body 2.

In the tire-holding device 10 according to the embodiment, the shaft body 2 is provided therein with a valve 7 which opens and closes between the inner hold 22 and the outer hole 24, the valve 7 includes a movable valve body 71, a valve seat 72 placed closer to the outer hole 24 than the valve body 71, and a projecting portion 74 which projects from the valve body 71 and which can move with respect to the valve seat 72 together with the valve body 71, and the projecting portion 74 passes through the valve seat 72 and extends toward the outer hole 24, and when the valve body 71 comes into contact with the valve seat 72, the projecting portion 74 projects from the end surface 27.

According to this configuration, the shaft body 2 is provided therein with the valve 7. The valve 7 includes the movable valve body 71, and the valve seat 72 placed closer to the outer hole 24 than the valve body 71. If the valve body 71 comes into contact with the valve seat 72, the valve 7 is closed, and the valve 7 closes between the inner hole 22 and the outer hole 24.

The projecting portion 74 projects from the valve body 71, and can move with respect to the valve seat 72 together with the valve body 71. The projecting portion 74 passes through the valve seat 72 and extends toward the outer hole 24. When the valve body 71 comes into contact with the valve seat 72, the projecting portion 74 projects from the end surface 27 of the shaft body 2. Therefore, when the shaft body 2 is supported by the support body 8, the projecting portion 74 is pressed by the support body 8 toward the interior of the shaft body 2. According to this, since the valve body 71 separates from the valve seat 72, the valve 7 opens, and opens between the inner hole 22 and the outer hole 24.

The tire-holding device 10 according to this embodiment includes the connecting body 4 which fixes the bladder 1 and connects the bladder 1 and the shaft body 2 to each other, the connecting body 4 includes a switching mechanism 5 for switching between a state where the connecting body 4 pressurizes and comes into contact with an peripheral surface 28 of the shaft body 2 and is fixed to the shaft body 2, and a movable state where the connecting body 4 can move in an axial direction of the shaft body 2 relative to the shaft body 2 by releasing the state where the connecting body 4 pressurizes and comes into contact with the peripheral surface 28 of the shaft body 2.

According to this configuration, the connecting body 4 which fixes the bladder 1 connects, to each other, the bladder 1 and the shaft body 2 which is inserted into the bladder 1. The connecting body 4 is switched by the switching mechanism 5 between the state where the connecting body 4 pressurizes and comes into contact with the peripheral surface 28 of the shaft body 2 and is fixed to the shaft body 2, and the movable state where the pressurized and contacted state is released so that the connecting body 4 can move in the axial direction relative to the shaft body 2. According to this, since the connecting body 4 can be fixed to the shaft body 2 at the plurality of positions of the shaft body 2, the bladder-fixing unit 1 can handle tires 200 of a plurality of sizes.

In the tire-holding device 10 according to the embodiment, the switching mechanism 5 includes a cylindrical inner cylindrical body 51 into which the shaft body 2 is inserted, and a cylindrical outer cylindrical body 52, if the outer cylindrical body 52 moves toward the one side in the axial direction relative to the inner cylindrical body 51, an inner periphery of the outer cylindrical body 52 comes into contact with an outer periphery of the inner cylindrical body 51, the inner cylindrical body 51 includes a pressured contact portion 51$f$ which pressurizes and comes into contact with the peripheral surface 28 of the shaft body 2, and an elastic portion 51$c$, and if the outer periphery of the inner cylindrical body 51 comes into contact with the inner periphery of the outer cylindrical body 52, the elastic portion 51$c$ elastically deforms such that the pressured contact portion 51$f$ approaches, pressurizes and comes into contact with the peripheral surface 28 of the shaft body 2.

According to this configuration, the shaft body 2 is inserted into the cylindrical inner cylindrical body 51. If the cylindrical outer cylindrical body 52 moves toward the one side in the axial direction relative to the inner cylindrical body 51, the inner periphery of the outer cylindrical body 52 comes into contact with the outer periphery of the inner cylindrical body 51. The inner cylindrical body 51 includes the pressured contact portion 51*f* which pressurizes and comes into contact with the peripheral surface 28 of the shaft body 2, and the elastic portion 51*c* which elastically deforms.

If the peripheral surface 28 of the inner cylindrical body 51 comes into contact with the inner periphery of the outer cylindrical body 52, the elastic portion 51*c* elastically deforms. Therefore, the pressured contact portion 51*f* approaches the outer periphery of the shaft body 2 and pressurizes and comes into contact with the outer periphery of the shaft body 2. According to this, the connecting body 4 is switched from the state where the connecting body 4 can move in the axial direction relative to the shaft body 2 to the state where the connecting body 4 is fixed to the shaft body 2.

The tire-holding device is not limited to the configuration of the embodiment described above, and the effects are not limited to those described above. It goes without saying that the tire-holding device can be variously modified without departing from the scope of the subject matter of the present invention. For example, the constituents, methods, and the like of various modified examples described below may be arbitrarily selected and employed as the constituents, methods, and the like of the embodiments described above, as a matter of course.

In the tire-holding device 10 of the embodiment, the outer holes 23 and 24 are placed in the end surface 27 of the shaft body 2, and the support holes 83 and 84 are placed in the end surface support portion 81 of the support body 8. However, the tire-holding device is not limited to this configuration. For example, in the tire-holding device, as shown in FIGS. 18 to 22, the second outer hole 24 may be placed in the peripheral surface 28 of the shaft body 2, and the second support hole 84 may be placed in the peripheral surface support portion 82 of the support body 8.

Figure 18:
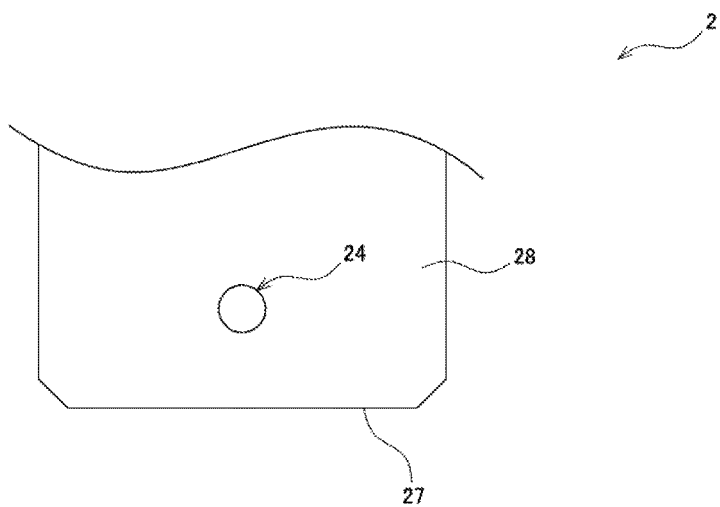
FIG. 18 is a side view of essential portions of a shaft body according to another embodiment.
Figure 19:
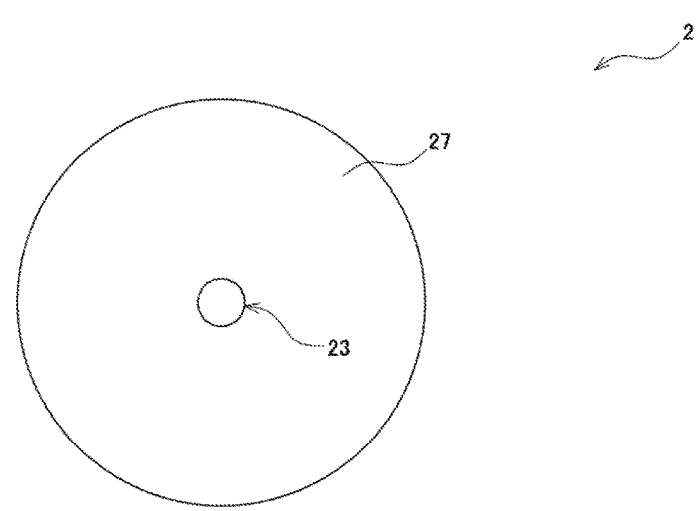
FIG. 19 is a side view of an entire shaft body according to the other embodiment.

As shown in FIGS. 18 and 19, the second outer hole 24 is formed circular. The second outer hole 24 is placed in a portion of the shaft body 2 which is supported by the support body 8. Specifically, the second outer hole 24 is placed in the peripheral surface 28 of the shaft body 2.

Figure 20:
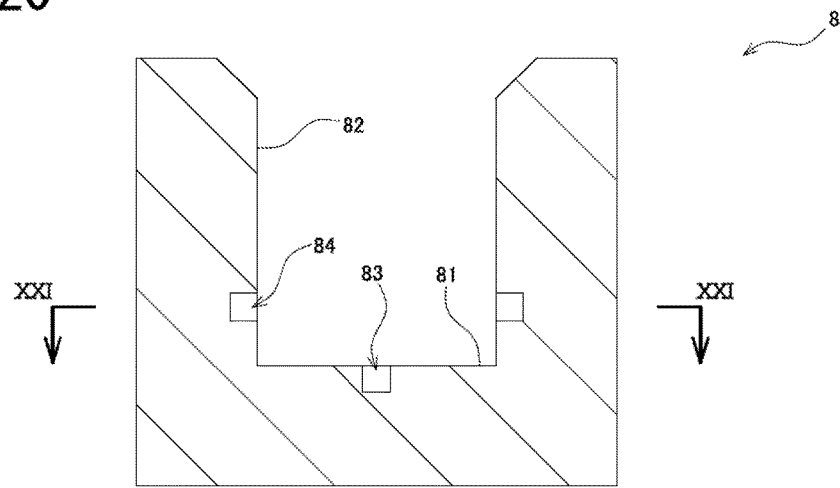
FIG. 20 is a vertical sectional view of an entire support body according to the other embodiment.
Figure 21:
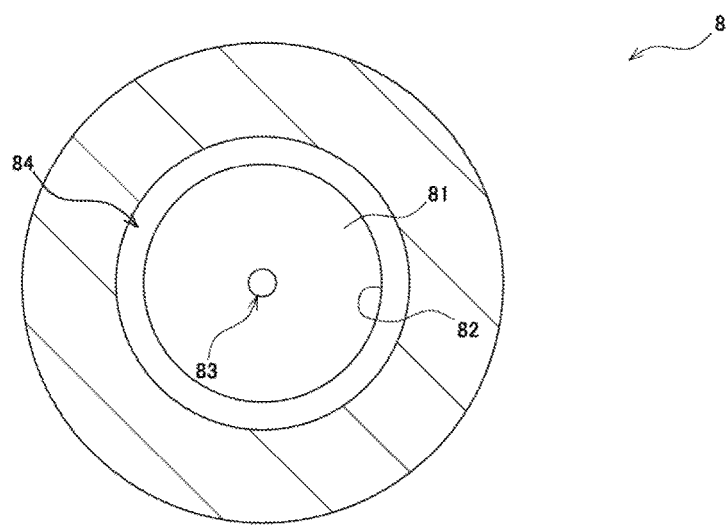
FIG. 21 is a sectional view of the entire support body according to the other embodiment, and is a sectional view taken along line XXI-XXIX in FIG. 20.

As shown in FIGS. 20 and 21, the second support hole 84 is placed on the peripheral surface support portion 82. The second support hole 84 extends around the axis of the shaft body 2 with respect to the shaft body 2 which is supported by the support body 8. In this embodiment, the second support hole 84 is formed continuously annularly shape.

Figure 22:
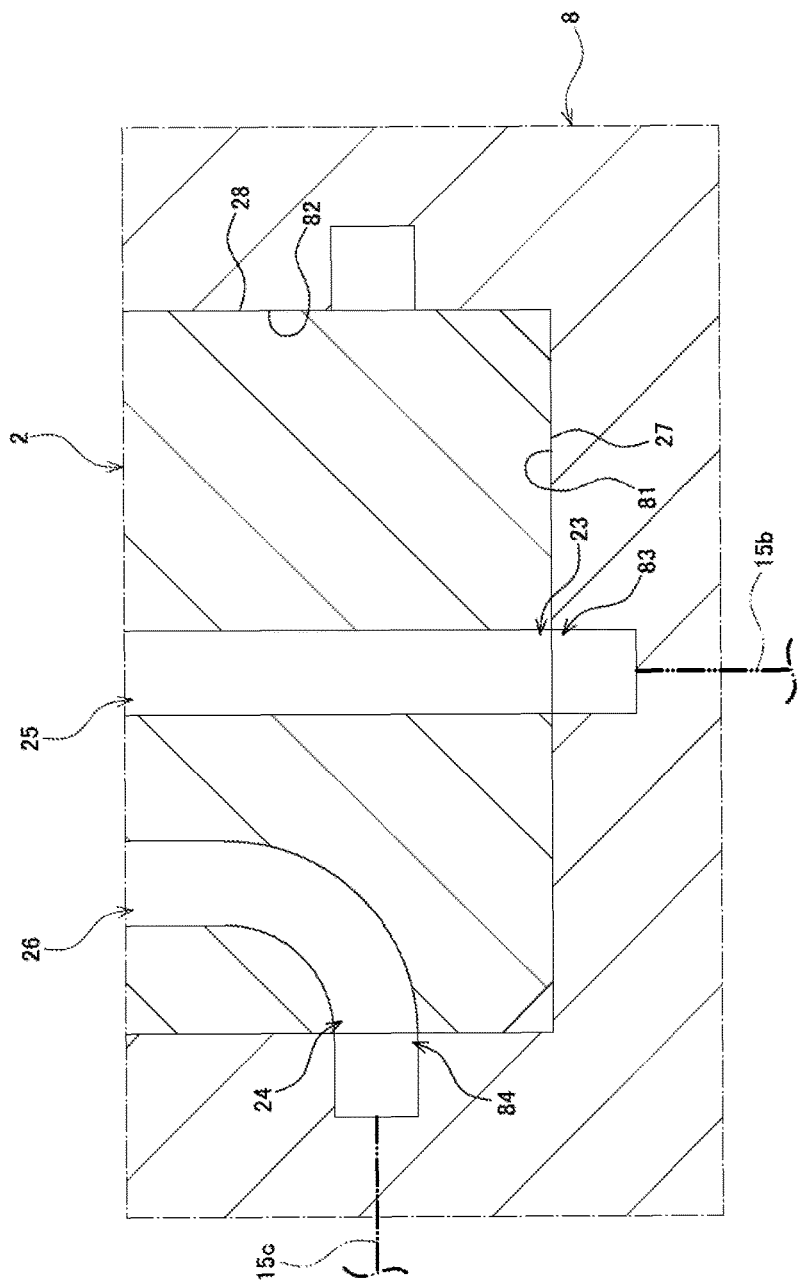
FIG. 22 is a diagram for describing an operation of the tire-holding device according to the other embodiment, and is a vertical sectional view of essential portions of the shaft body and the support body.

According to this, as shown in FIG. 22, when the support body 8 supports the shaft body 2, the second support hole 84 is in communication with the second outer hole 24 irrespective of the circumferential position of the shaft body 2 with respect to the support body 8 (i.e., irrespective of position of the second outer hole 24 with respect to support body 8). Like the embodiment, the first support hole 83 is also in communication with the first outer hole 23 irrespective of a circumferential position of the shaft body 2 with respect to the support body 8.

In this matter, in the tire-holding device 10 according to FIGS. 18 to 20, the support body 8 includes a peripheral surface support portion 82 which supports a peripheral surface 28 of the shaft body 2, the outer hole 24 is placed in the peripheral surface 28 of the shaft body 2, the support hole 84 is placed in the peripheral surface support portion 82, and when the support body 8 supports the shaft body 2, at least one of the outer hole 24 and the support hole 84 (support hole 84 in FIGS. 18 to 20) extends around the axis of the shaft body 2 such that the outer hole 24 and the support hole 84 come into communication with each other irrespective of a position of the shaft body 2 in its circumferential direction.

According to this configuration, the outer hole 24 is placed in the peripheral surface 28 of the shaft body 2. The support body 8 includes the peripheral surface support portion 82 which supports the peripheral surface 28 of the shaft body 2, and the support hole 84 is placed in the peripheral surface support portion 82. Since at least one of the outer hole 24 and the support hole 84 (support hole 84 in FIGS. 18 to 22) extends around the axis of the shaft body 2, when the support body 8 supports the shaft body 2, the outer hole 24 and the support hole 84 can be brought into communication with each other irrespective of a circumferential position of the shaft body 2.

In the tire-holding device of this embodiment, the shaft body 2 (specifically, valve 7) includes the projecting portion 74. However, the tire-holding device is not limited to this configuration. For example, in the tire-holding device, the support body 8 may include the projecting portion 85 as shown in FIGS. 23 and 24.

Figure 23:
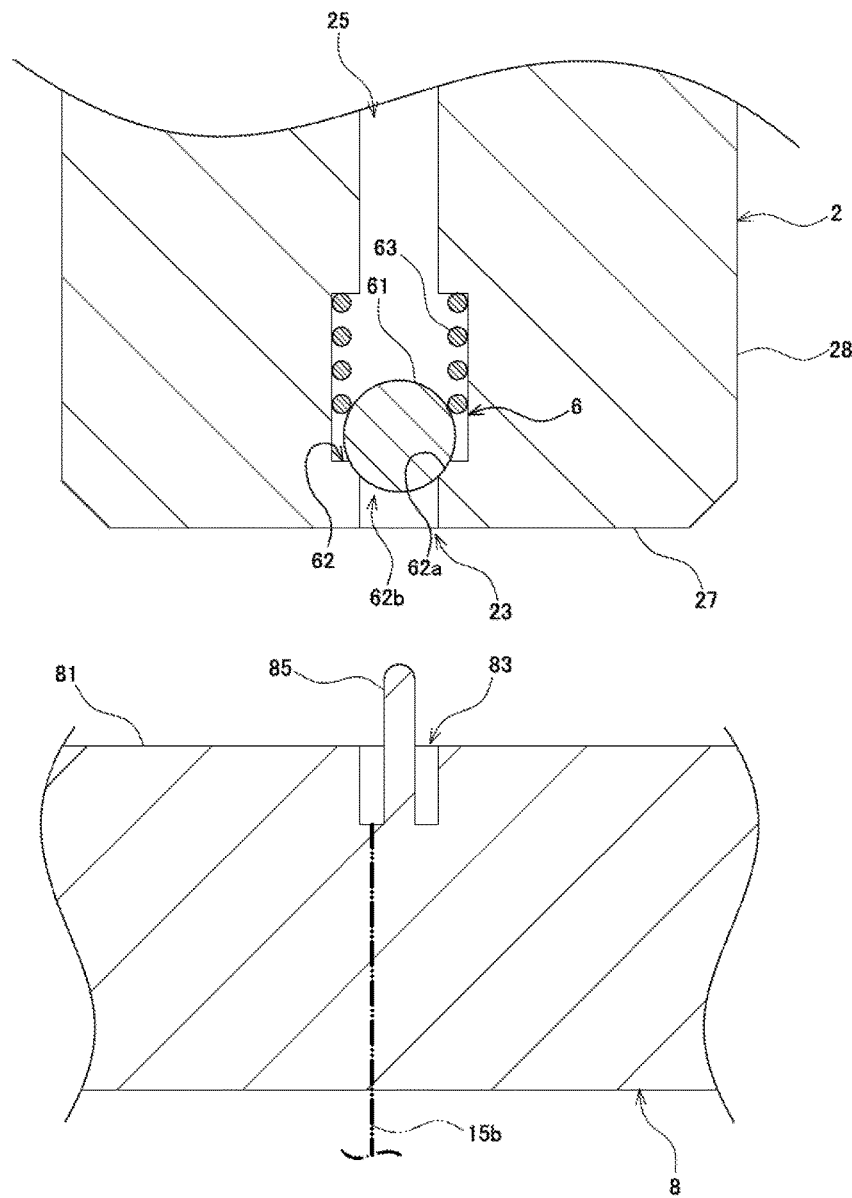
FIG. 23 is a diagram for describing an operation of a tire-holding device according to another embodiment, and is a vertical sectional view of essential portions of a shaft body and a support body.
Figure 24:
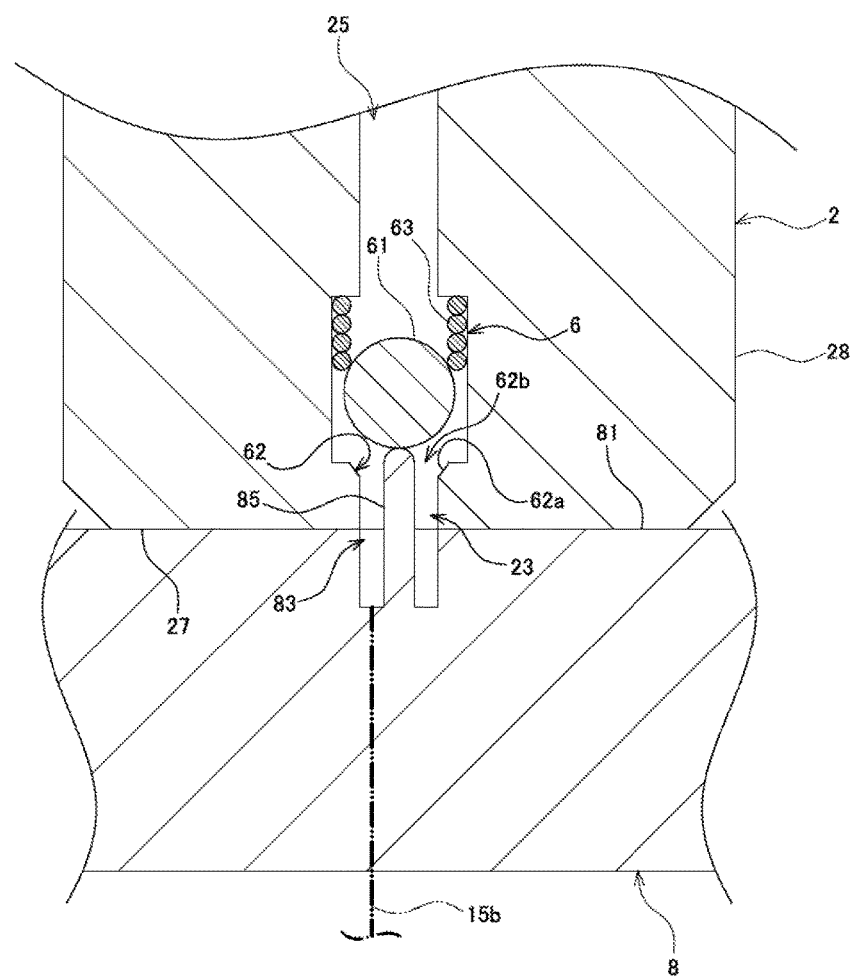
FIG. 24 is a diagram for describing an operation of the tire-holding device according to the other embodiment, and is a vertical sectional view of essential portions of the shaft body and the support body.

As shown in FIGS. 23 and 24, the outer hole 23 is placed in a position on the axis of the shaft body 2 of the end surface 27 of the shaft body 2 like the first outer hole 23 of this embodiment. Like the first valve 6 of this embodiment, the valve 6 includes a valve body 61, a valve seat 62, and an elastic body 63. Like the first support hole 83 of the embodiment, the support hole 83 is placed at a position of the end surface support portion 81 on the axis of the shaft body 2 with respect to the shaft body 2 supported by the support body 8.

The projecting portion 85 projects from the end surface support portion 81. Specifically, the projecting portion 85 projects from the support hole 83. A length of the projecting portion 85 is set to a predetermined length. According to this, when the end surface 27 of the shaft body 2 is supported by the end surface support portion 81 of the support body 8, the projecting portion 85 can press the valve body 61 against the biasing force of the elastic body 63 and the internal pressure of the bladder 1. Therefore, the valve 6 can be switched from the closed state to the opened state.

In this matter, in the tire-holding device 10 according to FIGS. 23 and 24, the shaft body 2 is provided therein with a valve 6 which opens and closes between the inner hold 21 and the outer hole 23, the valve 6 includes a movable valve body 61, and a valve seat 62 placed closer to the outer hole 23 than the valve body 61, the support body 8 includes a projecting portion 85 which projects from the end surface support portion 81, and a length of the projecting portion 85 is set in such a manner that when the support body 8 supports the shaft body 2, the projecting portion 85 passes through the outer hole 23 and the valve seat 62 to press the valve body 61.

According to this configuration, the shaft body 2 is provided therein with the valve 6. The valve 6 includes a movable valve body 61 and a valve seat 62 placed closer to the outer hole 23 than the valve body 61. If the valve body 61 comes into contact with the valve seat 62, the valve 6 is brought into the closed state, and the valve 6 closes between the inner hole 21 and the outer hole 23.

The projecting portion 85 projects from the end surface support portion 81 of the support body 8. Since the length of the projecting portion 85 is set to the predetermined length, when the shaft body 2 is supported by the support body 8, the projecting portion 85 passes through the outer hole 23 and the valve seat 62 and presses the valve body 61. According to this, since the valve body 61 separates from the valve seat 62, the valve 6 is brought into the opened state, and the valve 6 opens between the inner hole 21 and the outer hole 23.

In the tire-holding device of the embodiment, a portion of the shaft body 2 which is supported by the support body 8 is formed into columnar. However, the tire-holding device is not limited to this configuration. For example, in the tire-holding device, a portion of the shaft body 2 which is supported by the support body 8 may be formed into a regular polygonal columnar shape, and the peripheral surface support portion 82 of the support body 8 may be formed corresponding to this portion.

According to this configuration, the peripheral surface support portion 82 can lock the peripheral surface 28 of the shaft body 2 around the axis of the shaft body 2. Therefore, the shaft body 2 is restrained from rotating around the axis with respect to the support body 8 in a state where the shaft body 2 is supported by the support body 8. Further, although it is necessary to slightly position the shaft body 2 in the circumferential direction, it is unnecessary to precisely position the shaft body 2 in the circumferential direction as compared with the conventional configuration (e.g., configuration of JP-A-2007-98803).

Further, in the tire-holding device of the embodiment, the support body 8 supports both the end surface 27 and the peripheral surface 28 of the shaft body 2, i.e., the support body 8 includes both the end surface support portion 81 and the peripheral surface support portion 82. However, the tire-holding device is not limited to this configuration. For example, in the tire-holding device, the support body 8 may support only the end surface 27 or the peripheral surface 28 of the shaft body 2, i.e., the tire-holding device may include only the end surface support portion 81 or the peripheral surface support portion 82.

In the tire-holding device 10 of the embodiment, the outer hole 24 is circular in shape, and the support hole 84 is formed into an annular shape which makes the circuit of the axis of the shaft body 2 to be supported. However, the tire-holding device is not limited to this configuration.

For example, in the tire-holding device, the outer hole 24 may have an annular shape which makes the circuit of the axis of the shaft body 2 like the support hole 84. The outer hole 24 and the support hole 84 may have annular shapes extending along the axis of the shaft body 2 longer than half cycle. For example, the outer hole 24 may be an annular shape which makes the circuit of the axis of the shaft body 2, and the support hole 84 may have a circular shape.

In short, it is only necessary that the sum of a length of the outer hole 24 extending around the axis of the shaft body 2 and a length of the support hole 84 extending around the axis of the shaft body 2 exceeds a length of one circuit around the axis of the shaft body 2. According to this configuration, when the support body 8 comes into contact with the shaft body 2 and supports the shaft body 2, the outer hole 24 and the support hole 84 can be brought into communication with each other irrespective of the circumferential position of the shaft body 2.

In the tire-holding device 10 of the embodiment, when fluid biases the first valve body 61, the first valve 6 opens, and if the projecting portion 74 is pressed toward an interior of the shaft body 2, the second valve 7 opens. However, the tire-holding device is not limited to this configuration. For example, in the tire-holding device, the valves 6 and 7 may be any kinds of valves, and may be solenoid valves, and the shaft body 2 may not include the valves 6 and 7.

In the tire-holding device of the embodiment, the shaft body 2 includes two outer holes, i.e., the outer holes 23 and 24, and the support body 8 includes two support holes, i.e., the support holes 83 and 84. However, the tire-holding device is not limited to this configuration. For example, in the tire-holding device, the shaft body 2 may have one outer hole, or three or more outer holes, and the support body 8 may have one support hole, or three or more support holes.

In the tire-holding device of the embodiment, the connecting body 4 can move with respect to the shaft body 2, and the connecting body 4 comes into contact with the shaft body 2 under pressure and according to this, the shaft body 2 is fixed. However, the tire-holding device is not limited to this configuration. For example, in the tire-holding device, the connecting body 4 is fixed to the shaft body 2 in an immobile manner like the fixing body 3, or the connecting body 4 may be movable with respect to the shaft body 2, the connecting body 4 locks a locking portion which can move toward or away from the shaft body 2 and according to this, and the connecting body 4 may be fixed to the shaft body 2 like the conventional configuration (e.g., JP-A-2007-98803).

The tire-holding device 10 of the embodiment is provided in the tire-vulcanizing device 100. However, the tire-holding device is not limited to this configuration. For example, the tire-holding device may be configured such that the fluid supply device 300 in FIG. 13 may be provided with a function of the support body 8.

In the tire-holding device 10, at least one of the periphery of the outer holes 23 and 24 and the periphery of the support holes 83 and 84 may be made of elastic material (e.g., rubber). According to this configuration, it is possible to enhance the hermeticity between the outer holes 23 and 24 and between the support holes 83 and 84.

What is claimed is:

1. A tire-holding device comprising:
   a shaft body having a portion thereof inserted into a bladder which is fixed to the shaft body, the bladder expanding in a tire to hold the tire; and
   a support body which comes into contact with the shaft body to support the shaft body, wherein
   the shaft body includes an inner hole placed inside the bladder, and an outer hole placed outside the bladder and is brought into communication with the inner hole, and
   the support body includes a support hole, and when the support body supports the shaft body, the outer hole and the support hole come into communication with each other irrespective of a position of the shaft body in its circumferential direction.

2. The tire-holding device according to claim 1, wherein
   the support body includes an end surface support portion which supports an end surface of the shaft body,
   the outer hole is placed in a position on an axis of the shaft body in the end surface of the shaft body, and
   when the support body supports the shaft body, the support hole is placed at a position on the axis of the shaft body in the end surface support portion so that the support hole comes into communication with the outer hole irrespective of a position of the shaft body in the circumferential direction.

3. The tire-holding device according to claim 1, wherein
the support body includes an end surface support portion which supports an end surface of the shaft body,
the outer hole is placed at a position deviated from an axis of the shaft body in the end surface of the shaft body,
the support hole is placed at a position deviated from the axis of the shaft body in the end surface support portion, and
when the support body supports the shaft body, at least one of the outer hole and the support hole extends around an axis of the shaft body such that the outer hole and the support hole come into communication with each other irrespective of a position of the shaft body in the circumferential direction.

4. The tire-holding device according to claim 1, wherein
the support body includes a peripheral surface support portion which supports a peripheral surface of the shaft body,
the outer hole is placed in the peripheral surface of the shaft body,
the support hole is placed in the peripheral surface support portion, and
when the support body supports the shaft body, at least one of the outer hole and the support hole extends around the axis of the shaft body such that the outer hole and the support hole come into communication with each other irrespective of a position of the shaft body in its circumferential direction.

5. The tire-holding device according to claim 2, wherein
the shaft body is provided therein with a valve which opens and closes between the inner hole and the outer hole,
the valve includes a movable valve body, a valve seat placed closer to the outer hole than the valve body, and a projecting portion which projects from the valve body and which can move with respect to the valve seat together with the valve body, and
the projecting portion passes through the valve seat and extends toward the outer hole, and when the valve body comes into contact with the valve seat, the projecting portion projects from the end surface.

6. The tire-holding device according to claim 3, wherein
the shaft body is provided therein with a valve which opens and closes between the inner hole and the outer hole,
the valve includes a movable valve body, a valve seat placed closer to the outer hole than the valve body, and a projecting portion which projects from the valve body and which can move with respect to the valve seat together with the valve body, and
the projecting portion passes through the valve seat and extends toward the outer hole, and when the valve body comes into contact with the valve seat, the projecting portion projects from the end surface.

7. The tire-holding device according to claim 2, wherein
the shaft body is provided therein with a valve which opens and closes between the inner hole and the outer hole,
the valve includes a movable valve body, and a valve seat placed closer to the outer hole than the valve body,
the support body includes a projecting portion which projects from the end surface support portion, and
a length of the projecting portion is set in such a manner that when the support body supports the shaft body, the projecting portion passes through the outer hole and the valve seat to press the valve body.

8. The tire-holding device according to claim 5, wherein the valve includes an elastic body which biases the valve body toward the valve seat.

9. The tire-holding device according to claim 6, wherein the valve includes an elastic body which biases the valve body toward the valve seat.

10. The tire-holding device according to claim 7, wherein the valve includes an elastic body which biases the valve body toward the valve seat.

* * * * *